(12) United States Patent
Lafontaine

(10) Patent No.: US 7,109,851 B2
(45) Date of Patent: Sep. 19, 2006

(54) PRESENCE AND RECOGNITION SYSTEM

(75) Inventor: Yvan Lafontaine, Grand-Mère (CA)

(73) Assignee: Teleflex Megatech Inc., Grand-Mere (CA)

( * ) Notice: Subject to any disclaimer, the term of this patent is extended or adjusted under 35 U.S.C. 154(b) by 0 days.

(21) Appl. No.: 10/636,029

(22) Filed: Aug. 7, 2003

(65) Prior Publication Data

US 2005/0030154 A1 Feb. 10, 2005

(51) Int. Cl.
*B60R 25/10* (2006.01)

(52) U.S. Cl. ............................ 340/426.13; 340/426.17; 307/10.3

(58) Field of Classification Search ............ 340/426.13, 340/539.23, 426.36, 426.16, 426.17, 5.61, 340/5.6, 10.1; 307/10.3, 10.5, 10.6
See application file for complete search history.

(56) References Cited

U.S. PATENT DOCUMENTS

| | | | | |
|---|---|---|---|---|
| 5,144,300 A | * | 9/1992 | Kanno | .......................... 340/984 |
| 5,343,077 A | * | 8/1994 | Yoshida et al. | ............. 340/5.64 |
| 5,396,215 A | * | 3/1995 | Hinkle | ................... 340/426.17 |
| 5,595,257 A | * | 1/1997 | Yoshida et al. | .............. 180/287 |
| 6,366,198 B1 | * | 4/2002 | Allen et al. | ............. 340/426.17 |
| 6,582,261 B1 | * | 6/2003 | Kanno | .......................... 440/84 |

* cited by examiner

*Primary Examiner*—John Tweel, Jr.
(74) *Attorney, Agent, or Firm*—Baker & Hostetler LLP

(57) ABSTRACT

A transponder system for motor vehicle, used both as a RKE system and as a kill switch type safety system, is described herein. The transponder system includes an electronic lock assembly provided with a housing, an interrogator circuit and a coil antenna. The transponder system also includes an electronic key provided with a housing made of a slightly resilient material, a transponder circuit, and a coil antenna. The key assembly may be releasably mounted to the lock assembly since the housing of the key assembly is made of a slightly resilient material. Continuous interactions between the electronic lock and the electronic key are required for the continuous operation of the engine of the vehicle.

15 Claims, 2 Drawing Sheets

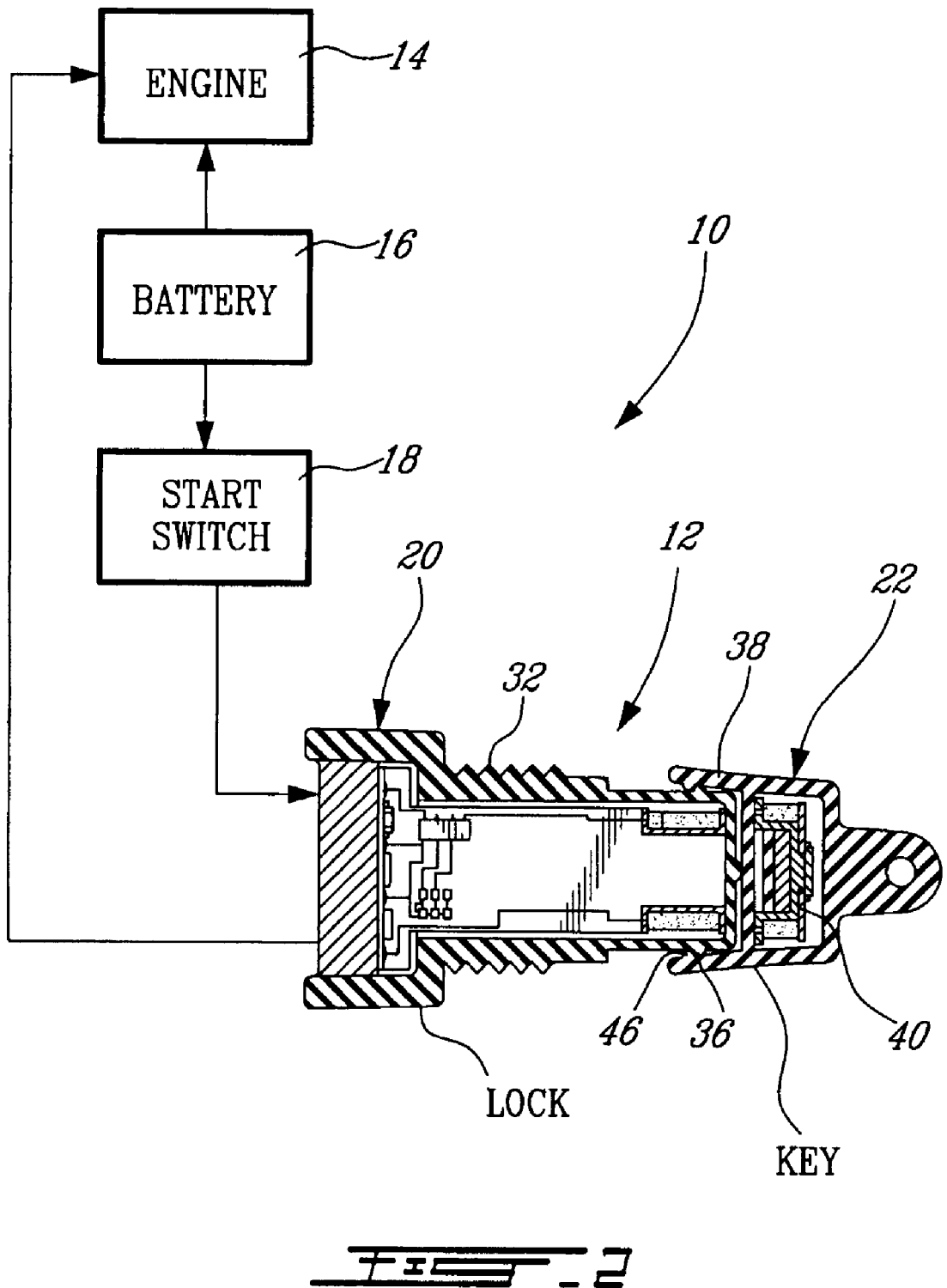
FIG_2

PRESENCE AND RECOGNITION SYSTEM

FIELD OF THE INVENTION

The present invention relates to presence and recognition systems and methods. More particularly, the present invention relates to a system used both as a remote keyless entry system and a safety device in a vehicle.

BACKGROUND OF THE INVENTION

Transponders are well known in the general field of security systems.

The use of transponders in this field generally concerns Remote Keyless Entry (RKE) systems. An interrogator circuit is used as a lock and a separate transponder circuit is used as a key. The interrogator circuit transmits a question signal, usually a Radio Frequency signal, that is received by the transponder. The question signal is then modified by the transponder according to a predetermined pattern to generate a response signal that is transmitted from the transponder back to the interrogator circuit. Upon receipt of this response signal, the interrogator circuit compares the received response signal with a stored expected response signal. If the comparison is accepted, the interrogator circuit generates an output signal to deactivate a mechanical lock or any other mechanism electrically connected to the interrogator circuit.

Improvements have been made in these RKE systems to provide keys that do not require power sources, i.e. batteries. In these cases, a portion of the energy of the received question signal is rectified by a rectifier circuit and stored in an energy storage element, usually a capacitor, to provide the required electrical energy to generate the response signal and to transmit this response signal.

A major drawback common to the transponder systems used as RKE systems concerns the constant powered on state of the interrogator circuit. This drawback is not so great when the interrogator is connected to the electrical power grid. However, when the interrogator circuit is used in a battery operated environment such as, for example a motor vehicle (an automobile, a snowmobile, an all-terrain vehicle, a boat, a personal water craft . . .) it is obviously not interesting to leave the interrogator circuit constantly energized.

Safety systems for vehicles using a kill switch automatically triggered when the driver of the vehicle is ejected from the vehicle are also generally well known. Usually, a lanyard links the driver to a mechanical switch that is automatically placed in an open position should the lanyard be disconnected from the switch. Such safety systems are often found on water crafts such as boats and personal water crafts, but could also be used on all-terrain vehicles, snowmobiles or other vehicles where the driver could be ejected.

U.S. Pat. No. 6,352,045 issued to Takashima and entitled "Immobilization system for watercraft" describes a transponder system used on a watercraft as a RKE system. Takashima's system also includes a conventional lanyard safety system provided with a mechanical kill switch to which an end of the lanyard must be connected for proper operation of the vehicle. The key of the transponder system is necessary for the ignition of the engine of the vehicle and the lanyard system is necessary for the continuing operation of the engine.

Canadian Patent application 2,206,286 published on Nov. 27, 1998 and entitled "Transponder System" describes a transponder system using a reed-switch and corresponding magnet to both energize the interrogator circuit and as a safety system. Indeed, the magnet is embedded in the key that is linked to the driver via a lanyard cord.

OBJECTS OF THE INVENTION

An object of the present invention is therefore to provide a presence and recognition system and method combining the features of both electronic RKE and safety systems.

SUMMARY OF THE INVENTION

More specifically, in accordance with the present invention, there is provided a presence and recognition system for a motor vehicle including an engine, said presence and recognition system comprising;

an electronic lock including first communication means being so configured as to periodically transmit a question signal and to generate an output signal when predetermined conditions have been met; and an electronic key including second communication means being so configured as to (a) receive the question signal, (b) modify the question signal according to a predetermined pattern to yield a response signal, (c) transmit the response signal to said first communication means;

wherein said output signal is required for continuous operation of the engine of the motor vehicle.

According to another aspect of the present invention, there is provided a presence and recognition system for a motor vehicle including an engine, said presence and recognition system comprising: an electronic lock including an interrogator circuit so configured as to periodically transmit a question signal and to generate an output signal when predetermined conditions are met; and an electronic key including a transponder circuit so configured as to receive the question signal from the interrogator circuit, modify the question signal according to a predetermined pattern to yield a response signal, transmit the response signal to said interrogator circuit;

wherein said output signal is required for continuous operation of the engine of the motor vehicle.

According to a third aspect of the present invention, there is provided a presence and recognition system for a motor vehicle including an engine, said presence and recognition system comprising:

an electronic lock including an interrogator circuit so configured as to periodically transmit a question signal; and an electronic key including a transponder circuit so configured as to receive the question signal from the interrogator circuit, modify the question signal according to a predetermined pattern to yield a response signal, transmit the response signal to said interrogator circuit;

wherein a) said interrogator circuit compares said response signal with an expected response signal and generates an output signal to the engine when said response signal corresponds to said expected response signal, and b) failure to periodically receive the output signal causes the engine to stop.

According to another aspect of the present invention, there is provided a presence and recognition method for a motor vehicle including an engine, said presence and recognition method comprising the acts of:

providing an electronic lock including first communication means;

providing an electronic key including second communication means;

transmitting, via the first communication means, a question signal;

receiving, via the second communication means, the question signal;

in the electronic key, modifying the question signal according to a predetermined pattern to yield a response signal;

transmitting, via the second communication means, the response signal;

in the electronic lock, receiving the response signal and comparing it with an expected response signal; and generating an output signal to the engine when predetermined conditions have been met;

wherein said output signal is required for continuous operation of the engine of the motor vehicle.

Other objects, advantages and features of the present invention will become more apparent upon reading of the following nonrestrictive description of preferred embodiments thereof, given by way of example only with reference to the accompanying drawings.

BRIEF DESCRIPTION OF THE DRAWINGS

In the appended drawings:

FIG. 2 is a block diagram of the vehicle of FIG. 1 where the electronic key is in contact with the electronic lock.

DETAILED DESCRIPTION

Figure 1:
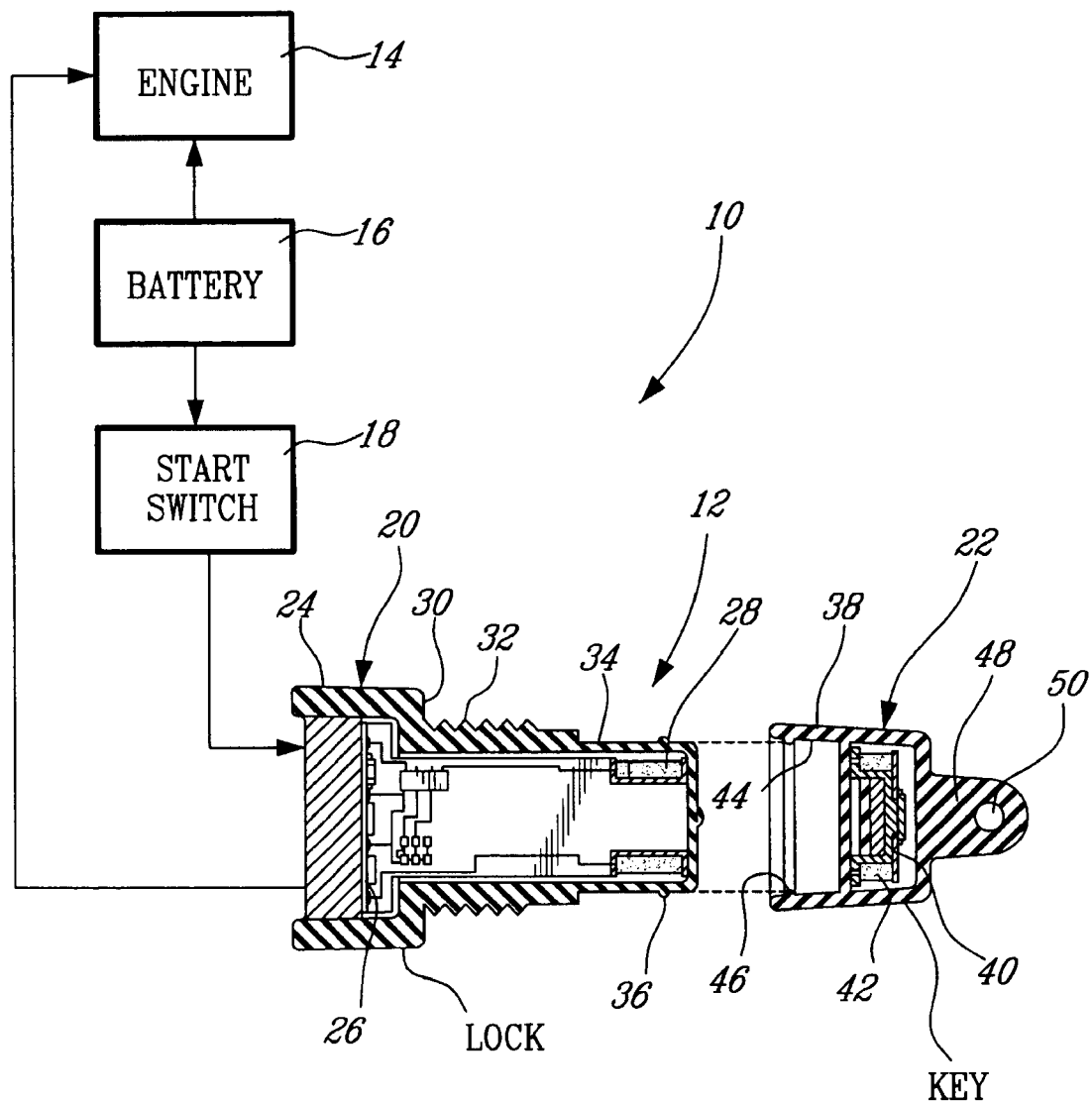
FIG. 1 is a block diagram of a vehicle provided with a transponder system according to an embodiment of the present invention.

In a nutshell, the present invention is concerned with a transponder system combining the functions of a RKE system and the functions of a kill switch safety system. The transponder system is therefore required for the vehicle to start in a generally conventional manner. Furthermore, the continuous presence of the key in the vicinity of the lock is required for the operation of the engine.

FIG. 1 of the appended drawings schematically illustrates a vehicle 10 provided with a transponder system 12 according to an embodiment of the present invention. The vehicle 10 includes an internal combustion engine 14, a battery 16 and a start switch 18. The transponder system 12 includes an electronic lock assembly 20 and an electronic key assembly 22.

Of course, the vehicle 10 includes other elements not illustrated in the appended figures since they are not relevant to the present invention.

The electronic lock assembly 20 is connected to the battery 16 via the start switch 18. The assembly 20 is therefore initially energized when the start switch 18 is in a conducting state.

The electronic lock assembly 20 includes a housing 24, an interrogator circuit 26 and a coil antenna 28 electrically connected to the interrogator circuit 26.

The housing 24 includes a shoulder 30, a threaded portion 32 a cylindrical portion 34 and a peripheral external rib 36 provided on the cylindrical portion 34. It is therefore possible to conveniently install the housing 24 in an aperture slightly larger than the threaded portion 32 and smaller than the shoulder 30. A threaded nut (not shown) may then be mounted to the threaded portion 32 to hold the housing 24 in place.

The housing 24 may be made of a material that is resistant to ultraviolet radiation, to salt water, to oil, to gasoline, and to many chemical products while being a rigid material. For example, XENOY 2230TM manufactured by General Electric Plastic is a polyester alloy containing glass fiber adequate for the manufacture of the housing 24.

The coil antenna 28 is used in the communication between the electronic lock assembly 20 and the electronic key assembly 22 as will be described hereinafter. As can be seen from the appended figures, the coil antenna 28 has a relatively large diameter.

The electronic key assembly 22 includes a housing 38, a transponder circuit 40 and a coil antenna 42 electrically connected to the transponder circuit 40.

The housing 38 is made of a slightly resilient material, such as, for example, MONOPRENE RT 2990TM, manufactured by QST Inc. This material, while being slightly flexible, has properties similar to the material forming the housing 24 of the lock assembly 20.

The housing 38 includes a generally cylindrical aperture 44 provided with an internal rib 46. The housing 38 also includes a projection 48 provided with an aperture 50 allowing the housing 34 to be secured to the user through a lanyard cord (not shown).

The internal diameter of the internal rib 46 is slightly larger than the external diameter of the cylindrical portion 34 of the lock assembly 20 and slightly smaller than the external diameter of the external rib 36. Since the housing 38 of the key assembly 22 is made of slightly resilient material, the cylindrical aperture 44 and the internal rib 46 will be slightly deformed to go over the external rib 36. The key assembly 22 will therefore be removably maintained onto the lock assembly 20 by the contact between the ribs 46 and 36.

It is to be noted that a pulling action on the key assembly 22 will release the key assembly 22 from the lock assembly 20 even if the pulling action is not in a longitudinal direction with respect to the lock assembly 20. Indeed, the resiliency of the housing 38 of the key assembly 22 enables the disconnection of the assemblies 22 and 20 from a wide range of pulling directions, partially determined by the resiliency of the housing 38.

The coil antenna 42 is used in the communication between the electronic lock assembly 20 and the electronic key assembly 22 as will be described hereinafter. As can be seen from the appended figures, the coil antenna 42 has a relatively large internal diameter.

It is to be noted that the interrogator circuit 26 and the transponder circuit 40 are generally well known in the art and that, accordingly, they will not be further discussed herein. Indeed, it is believed to be within the reach of one of ordinary skill in the art to design these circuits having the features described herein.

The operation of the vehicle 10 provided with a transponder system 12 according to an embodiment of the present invention will now be described.

To start the vehicle, a user first mounts the electronic key assembly 22 onto the electronic lock assembly 20 (see FIG. 2). Minimal force is required to slightly deform the key housing 38 so that the rib 46 gets over rib 36.

When the key assembly 22 is mounted to the lock assembly 20 as described hereinabove, the user simply has to actuate the start switch 18 to energize the interrogator circuit 26. A first question signal is then transmitted by the interrogator circuit 26 via the coil antenna 28.

The coil antenna 42 of the key assembly 22 receives the question signal and supplies this signal to the transponder circuit 40.

A portion of the energy of the question signal is rectified by a rectifier circuit included in the transponder circuit 40 and is used to supply power to the other portions of the transponder circuit 40.

The transponder circuit 40 receives the question signal and modifies it according to a predetermined pattern to generate a response signal that is transmitted back to the interrogator circuit 26 by the transponder via the coil antenna 42.

The response signal is received by the coil antenna 28 and is supplied to the interrogator circuit 26. Verification is then made to determine if the modification made to the question signal to yield the response signal is in accordance with the predetermined pattern that must be followed by the legitimate key assembly. In essence, a comparison is made between the received response signal and an expected response signal. If an adequate response signal is received, i.e. if the received response signal positively matches the expected response signal, the interrogator circuit 26 generates an output signal via its connection to the engine 14 to allow the engine to start. As a non-limiting example, the interrogator circuit could activate a solid-state relay (not shown) that would interconnect the engine 14 to the battery 16.

Once the vehicle is started, the transponder system 12 is used as a kill switch safety device. In other words, the generation of the output signal by the interrogator circuit is required for the continuous operation of the engine 14. Indeed, the interrogator circuit 26 periodically transmits a question signal that is modified by the transponder circuit 40 and retransmitted to the interrogator circuit 26. Should the key 22 be removed from the lock 20, for example if the driver falls off the vehicle, no response signal will be received the next time the interrogator circuit 26 transmits a question signal. Failure to receive the expected response signal from the key 22 will automatically cause the lock 20 to stop the generation of the output signal, stopping the engine, for example by opening the previously mentioned solid state relay (not shown).

For example, the interrogator circuit could transmit a question signal once every 0.2 second. Of course the period of the question signal transmission by the interrogator circuit could be different.

Accordingly, one skilled in the art will appreciate that by using the transponder system of the present invention, the conventional mechanical kill switch may be omitted, thereby reducing the costs and complexity of the vehicle.

It is to be noted that the interrogator circuit 26 and the transponder circuit 40 are advantageously programmable to enable the circuits 26 and 40 to be configured so that the modifications made to the question signal to generate the response signal yield the expected response signal. Indeed, if the circuits 26 and 40 are programmable, it is possible to use the same circuits without hardware modifications to yield different RKE systems.

One skilled in the art will also understand that a transponder system according to an embodiment of the present invention could advantageously be used in a battery operated environment such as, for example a motor vehicle (an automobile, a snowmobile, an all-terrain vehicle, a boat, a personal water craft . . .) where it is advantageous to detect and to react to the eventual fall of the driver from the vehicle.

Furthermore, since only a pulling action is required to disconnect the key assembly 22 from the lock assembly 20, the transponder system 12 is advantageously used in motor vehicles. The fact that there is no metallic contact between the lock assembly 20 and the key assembly 22 is another advantage when the transponder system of the present invention is used in water crafts since no corrosion can occur.

It is to be noted that while the appended figures illustrate a vehicle 10 provided with a battery 16, transponder systems according to embodiments of the present invention are suited to be installed on batteryless vehicles. Usually, these vehicles are provided with a crank-operated dynamo that supplies the electrical voltage required to start the engine and with a small generator to keep the engine running. In this case, the interrogator circuit 26 could automatically be powered by the dynamo and subsequently by the vehicle's generator to constantly verify that the transponder key 22 is still in the vicinity of the interrogator circuit 26.

Although the present invention has been described hereinabove by way of preferred embodiments thereof, it can be modified, without departing from the spirit and nature of the subject invention as defined in the appended claims.

What is claimed is:

1. A presence and recognition system for a motor vehicle including an engine, said presence and recognition system comprising:

an electronic lock including first communication means being so configured as to periodically transmit a question signal and to generate an output signal when predetermined conditions have been met; and an electronic key including second communication means being so configured as to (a) receive the question signal, (b) modify the question signal according to a predetermined pattern to yield a response signal, (c) transmit the response signal to said first communication means;

wherein said output signal is required for continuous operation of the engine of the motor vehicle.

2. A presence and recognition system as recited in claim 1, wherein said predetermined conditions include a positive match between a response signal received by said first communication means and an expected response signal.

3. A presence and recognition system as recited in claim 1, wherein said first communication means include an interrogator circuit and an antenna.

4. A presence and recognition system as recited in claim 3, wherein said antenna is a coil antenna.

5. A presence and recognition system as recited in claim 1, wherein said second communication means include a transponder circuit and an antenna.

6. A presence and recognition system as recited in claim 5, wherein said antenna is a coil antenna.

7. A presence and recognition system as recited in claim 5, wherein the response signal is generated by said transponder circuit by modifying the question signal.

8. A presence and recognition system as recited in claim 1, wherein (a) said electronic lock further includes a lock housing having with a cylindrical portion provided with an external rib, (b) said electronic key assembly further includes a key housing made of a slightly resilient material and having a cylindrical aperture provided with an internal rib, said cylindrical aperture being sized to be removably mountable to said cylindrical portion of said lock housing, said internal and external ribs providing a resilient lock between the key housing and the lock housing.

9. A presence and recognition system as recited in claim 1, wherein said periodic transmission of a question signal by said electronic lock occurs about every 0.2 second.

10. A presence and recognition system for a motor vehicle including an engine, said presence and recognition system comprising:
- an electronic lock including an interrogator circuit so configured as to periodically transmit a question signal and to generate an output signal when predetermined conditions are met; and
- an electronic key including a transponder circuit so configured as to receive the question signal from the interrogator circuit, modify the question signal according to a predetermined pattern to yield a response signal, transmit the response signal to said interrogator circuit;
- wherein said output signal is required for continuous operation of the engine of the motor vehicle.

11. A presence and recognition system as recited in claim 10, wherein said predetermined conditions include a positive match between a response signal received by said first communication means and an expected response signal.

12. A presence and recognition system as recited in claim 11, wherein said periodic transmission of a question signal by said electronic lock occurs about every 0.2 second.

13. A presence and recognition system for a motor vehicle including an engine, said presence and recognition system comprising:
- an electronic lock including an interrogator circuit so configured as to periodically transmit a question signal; and
- an electronic key including a transponder circuit so configured as to receive the question signal from the interrogator circuit, modify the question signal according to a predetermined pattern to yield a response signal, transmit the response signal to said interrogator circuit;
- wherein a) said interrogator circuit compares said response signal with an expected response signal and generates an output signal to the engine when said response signal corresponds to said expected response signal, and b) failure to periodically receive the output signal causes the engine to stop.

14. A presence and recognition system as recited in claim 13, wherein said periodic transmission of a question signal by said electronic lock occurs about every 0.2 second.

15. A presence and recognition method for a motor vehicle including an engine, said presence and recognition method comprising the acts of:
- providing an electronic lock including first communication means;
- providing an electronic key including second communication means;
- transmitting, via the first communication means, a question signal;
- receiving, via the second communication means, the question signal;
- in the electronic key, modifying the question signal according to a predetermined pattern to yield a response signal;
- transmitting, via the second communication means, the response signal;
- in the electronic lock, receiving the response signal and comparing it with an expected response signal; and
- generating an output signal to the engine when predetermined conditions have been met;
- wherein said output signal is required for continuous operation of the engine of the motor vehicle.

* * * * *